United States Patent [19]

Beauvias, II

[11] Patent Number: 4,929,027
[45] Date of Patent: May 29, 1990

[54] PASSIVE RESISTANCE ENHANCER FOR SAFETY SEAT BELT

[76] Inventor: Roger R. Beauvias, II, 6246 Dulin Creek Rd., House Springs, Mo. 63051

[21] Appl. No.: 261,421

[22] Filed: Oct. 24, 1988

[51] Int. Cl.$^5$ .............................................. B60R 21/00
[52] U.S. Cl. ................................... 297/482; 280/808; 297/488
[58] Field of Search ...................... 297/482, 487, 488; 280/801, 808, 733

[56] References Cited

U.S. PATENT DOCUMENTS

| 3,306,662 | 2/1967 | Finnigan | 297/482 |
| 3,957,282 | 5/1976 | Finnigan | 297/482 |
| 4,693,495 | 9/1987 | LaPointe | 297/482 X |
| 4,741,574 | 5/1988 | Weightman et al. | 297/482 |
| 4,786,080 | 11/1988 | Jay | 297/402 X |

FOREIGN PATENT DOCUMENTS

| 2949136 | 5/1981 | Fed. Rep. of Germany | 297/482 |
| 3019378 | 11/1981 | Fed. Rep. of Germany | 297/482 |

Primary Examiner—Peter R. Brown
Attorney, Agent, or Firm—Paul M. Denk

[57] ABSTRACT

A passive restraint enhancer for application in supplementing the safety of a seat belt, of the shoulder harnessing type, for minimizing or preventing injury in vehicle accidents, the restraint includes a sleeve device, having one or more channels therethrough, the seat belt and a rigid support locate within the sleeve device, with the seat belt being arranged overlying and in front of the rigid support, with the support having resiliency, functioning to disseminate the forces of impact encountered during an accident, and to prevent the seat belt from creasing and causing additional injury to the passenger when impact occurs. The sleeve device may be formed of a singular fabric or polymer material, and folded into a configuration for holding the seat belt and rigid support in place, as when permanently installed, or it may include a liner, being at least partially removable, to allow the seat belt to be inserted therein, when the restraint is sold and used in the aftermarket.

1 Claim, 3 Drawing Sheets

PASSIVE RESISTANCE ENHANCER FOR SAFETY SEAT BELT

BACKGROUND OF THE INVENTION

This invention relates generally to a passive restraint in the form of means for cooperating with the seat belt to assure the safety of any driver or passenger supported by the same, within a vehicle, and to prevent the incurrence of needless injury in the event that an impacting accident should occur.

Safety of the driver, in addition to passengers, has long been of prime interest to the automotive manufacturers, the various safety councils and governmental agencies that maintain statistics pertaining to vehicle accidents, and injuries sustained, and in addition, the general driver himself/herself has utmost concern about their safety, particularly when driving their own vehicle, and especially for any passengers they may have therein. Human interest in the safety of oneself, and anyone surrounding you, is of primary concern to the vehicle owner, but likewise, the safety of the passengers in your car, and while driving, is of significant interests, not only to reduce any injury that might be sustained, but likewise, insurance costs and the legal complications and ramifications that occur, as a result of an accident, are overwhelming.

For the foregoing reasons, the installation of seat belts in vehicles came of vogue in the 1960's, and many jurisdictions have imposed mandatory seat belts, at least for front seat passengers, in order to add to passenger safety. But, most, if not all, of the seat belts installed within vehicles, even currently, are fabricated of a canvas like woven material, and as result, while they are effective for restraining purposes, and prevent the passenger from being thrown too forwardly and rapidly, to reduce physical damage through impact, in a severe accident, it has been found that the belts have a tendency to collapse, longitudinally, and crease along their approximate center line, and in effect, form a type of cutting edge that can cause damage to the passenger itself. Thus, that type of an impairment is just as damaging if not deadly to the passenger, as has been found and analyzed, as a result of study of severe accidents happening in the past, as is the superficial damage done to the passenger, upon impacting a frontal portion of the vehicle that the passenger hits upon the occurrence of an accident.

Various passenger restraints have been constructed, in an effort to alleviate problems for the driver, and the passenger, seated within a vehicle. For example, the patent to Von Ardenne, et al, No. 3,134,626, shows a safety belt for passengers of vehicles, which incorporates the usual style of canvas belt, but in this particular instance, is treated for the purpose of enhancing the load bearing capacity of the belt, in addition to enhance its useful life.

The patent to Finnigan, No. 3,306,662, discloses an attachment for vehicle safety belts and shoulder harness. This particular device shows a series of what appears to be cylindrical members located within the seat belt and which interconnect with the air conditioning system for the ventilation and comfort of the wearer.

The patent to Fein, No. 3,397,913, shows a detachable decorative seat belt cover.

The patent to Bennett, No. 3,720,445, discloses a passenger restraint barrier, which incorporates a triangular barrier means to afford impact cushioning within a waist portion of a seat belt.

The patent to Finnigan, No. 3,957,282, shows an attachment for a vehicle shoulder harness, which is the addition of a soft resilient material embracing the shoulder belt apparently for comfort purposes.

The patent to Johnson, No. 4,004,583, discloses a restraining device, for use for maintaining the restraint of a prisoner.

The patent to Ocel, et al., No. 4,177,807, discloses another form of restraining belt for patients, particularly those in the wheelchair, etc.

The patent to Friedman, No. 4,324,204, shows an animal safety restraint for vehicles, and which provides a belt means, attaching to the back of the vehicle seat, for holding the dog in place.

The patent to Cunningham, No. 4,341,422, shows another form of restraint device, of the type that fits between the adult lap safety belt and the abdomen of a child, for securing the child in place.

The patent to Law, et al, No. 4,348,037, shows a safety cushion apparatus that attaches to an automotive vehicle belt-type restraint, and is designed to soften and cushion the shock of a sudden constraint against the user's body, but apparently does not incorporate any type of force or pressure dissemination means, as developed in this current invention. This prior art cushion apparently incorporates an inflatable cushioning means, in order to resist impact.

The patent to Spill, No. 4,619,468, shows a cover for a seat belt for an automobile, which, once again, the cover is apparently provided for cushioning purposes, if not to protect the underlying clothing worn by the passenger.

The patent to Quartano, No. 4,666,207, shows a form of child shopping cart cushion, obviously for supporting an infant within a shopping cart while the mother markets.

The patent to Wold, No. 4,678,205, shows a method and apparatus for use with a safety harness, in this particular instance, includes the folding of a comforting material around the seat belt in order to add to the convenience of its wearer.

The patent to La Pointe, No. 4,693,495, shows a shoulder belt cushion, that apparently simply folds around the seat belt, as shown in its FIG. 1, and incorporates a pad therein, for comfort purposes, but not to attain force dissemination.

The patent to Saenz, No. 4,699,401, shows a removable seat belt cover, which in this particular instance, apparently incorporates pockets for holding miscellaneous personal items. In the case of an accident, it is not believed that such items, such as a pen, as shown, should desirably be located upon the seat belt, which is designed to function as a safety means for the passenger.

The patent to Weightman, et al., No. 4,741,574, discloses another form of seat belt cover and cushion.

It is, therefore, the principal object of this current invention to improve upon seat belts and their cushioning and safety means as shown in the prior art, by adding a force dissemination means in cooperation with the belt to prevent the belt from creasing, as previously explained, when a heavy impact is encountered by the passenger, as when an accident occurs, and at the same time, to provide for dissemination of the impacting forces over a greater surface area, to reduce injury during the occurrence of such an accident.

Another object of this invention is to provide a substantially rigid but resilient support used in conjunction with a seat belt, in order to spread the forces of impact encountered by the passenger during a vehicle accident.

It is another object of this invention is to provide a substantially rigid but resilient support means used in conjunction with a seat belt, and which may be of a supplemental design, for addition to the safety of a seat belt already in usage, or it may be permanently installed with the seat belt as original equipment.

Still another object of this invention is to provide a passive restraint enhancer for application in conjunction with the seat belt, and which effectively prevents any foldage or creasing of the seat belt, which can normally exert impairing pressure upon the passenger, when an accident occurs.

Still another object of this invention is to provide the passive restrain enhancer, incorporating a substantially rigid but resilient support, and which tends to elongate, when pressure is exerted upon it, in order to reduce the forces of impact encountered when an accident occurs.

Yet another object of this invention is to provide a passive resistance enhancement for use in conjunction with the seat belt and which increases its surface area to the occupant for greater dissemination of impacting forces and a reducing of belt related injuries.

These and other objects may become more apparent to those skilled in the art upon reviewing the summary of this invention, and upon undertaking a study of the description of its preferred embodiment, in view of the drawings.

SUMMARY OF THE INVENTION

This invention contemplates a supplement to the standard seat belts installed by the automobile manufacturers in new automobiles, or when installed after a sale over the counter. More specifically, the invention pertains to that style of seat belt that is of the shoulder harnessing type, that generally diagonally, or vertically extends from the shoulder down to the waist located belt, as a means for providing passive restrain to the driver, or the passenger, located within a vehicle. More specifically, this invention includes an attachment, either as an item of original equipment, that can be permanently installed onto the shoulder harness portion of the safety belt, or as a additional means that may be temporarily or removably located, onto the same shoulder harness portion of a seat belt, and function to enhance the passive restraining afforded by the seat belt, during vehicle travel, and particularly when any heavy impact is encountered, such as when an accident occurs.

Regardless whether this invention is installed permanently as original equipment, or as a supplemental addition to the seat belt for removable attachment thereto, the main concept of the invention is to provide a substantially rigid support, one that is yet sufficiently resilient in its structure to afford a greater surface area than the seat belt itself, but yet is sufficiently rigid such that when the driver or passenger is thrusted against it, as when a sudden stop or when an accident occurs, the support affords greater dissemination of the forces of impact over a larger surface area of the underlying segment of the body, to resist injury to the wearer, while simultaneously, preventing the standard seat belt itself from causing injury to the wearer's body, under conditions as previously explained.

The invention incorporates a sleeve means, which extends substantially the length from the shoulder down to the approximte abdomen of the passenger, and envelopes the harness portion of the seat belt, along this longitudinal location. In addition, the sleeve means incorporates the substantially rigid but resilient support, as previously explained, and disposes it just underneath, or behind, the seat belt, intermediate the position of the belt and the passenger wearing the same, so that when impact occurs, the forces of the impact transmitted through the belt, and to the passenger, because of the sudden momentus thrust forwardly of the passenger, spreads the forces of impact throughout the entire support, over a greater surface area of the passenger's body, in order to reduce and minimize any amount of damaging impact encountered by the passenger. In addition, because of the rigidity of the support itself, as previously explained, the normally canvas or fabric woven seat belt will be prevented from creasing, a predicament which has occurred with prior art belts, and therefore, prevents or reduces direct and sustained injury to the passenger, as has previously occurred.

The sleeve means incorporates at least one channel therethrough, with the seat belt extending through such channel, and in addition, the rigid support means may likewise locate through the same channel. Under that condition, both the seat belt and the rigid support means will be reasonably fixed into position, through securement of the sleeve means about these components, in order to provide a permanent installation that may be located within the original equipment for the manufactured vehicle.

As an alternative design, and one which may be readily distributed upon the aftermarket, the sleeve means may be formed having its channel therein, which forms a pocket within the sleeve means, and in which the substantially rigid but resilient support inserts, for reasonably permanent installation. The support may be slid into the formed channel pocket, and the upper end of the pocket may be maintained in closure, either by stitching, or perhaps by the use of VELCRO, which is the hook and pile style of fastening means. In addition, the sleeve means contains a second channel upon its frontal surface, and through this channel the standard seat belt may locate, in a frontal position, overlying the rigid support, in order to maintain this aligned positioning, as previously explained, to provide for the forces of impact encoutered between the body and the seat belt, to be resisted through the support means, when impact is encountered. The second channel means may be formed through the application of a supplemental liner, to the frontal surface of the sleeve means, and this liner may be stitched along one longitudinal side edge, as along the height of the sleeve means, and utilize closure means upon its opposite side edge, such as through the use of the hook and pile style of fastening means, which may be pulled open, to allow the insertion of the seat belt therein, when the passive restraint is installed, and then closed, to allow for the VELCRO to furnish securement for the second channel means, and thereby contain the seat belt therein, and into position for cushioning of the passenger against any impact, by spreading its abrupt forces encountered in an accident through the rigid support, to cause a dissemination of the forces of impact, and reduce injury to the wearer.

To further add enhancement to the usage and application of this device, the rigid support means may be formed of a polymer, and perhaps have a width that is significantly wider than the seat belt itself, perhaps twice its width, and likewise be formed of a molded undulating appearance, along its longitudinal length, so that when impact is encountered, as when an accident occurs, or a sudden stop is encountered, the support means has a tendency to expand along its height, by flattening from its memorized undulating configuration, to thereby further cushion the forces of impact encountered by the passenger, during usage and application of the invention of this design.

These are examples of the generalized component parts that are fabricated into the passive restraint of this invention as used in conjunction with a seat belt, and their usage in combination, but the details of its exact configuration will be hereinafter defined.

BRIEF DESCRIPTION OF THE DRAWINGS

In the drawings, FIG. 1 provides an isometric view of the passive restraint enhancer for application in supplementing the safety of a seat belt as shown connecting upon the shoulder harness portion of such a seat belt, installed upon the driver, located within a vehicle.

DESCRIPTION OF THE PREFERRED EMBODIMENT

Figure 1:
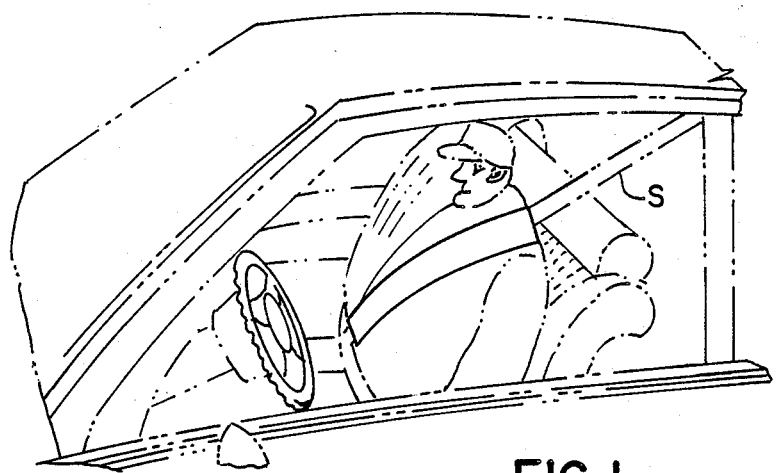

In referring to the drawings, and in particular FIG. 1, the concept of this invention in actual practice is shown as the passive resistance restrain means 1 used in conjunction with the seat belt, as at S, applied to the driver as an addition to the shoulder harness strap as used in conjunction with the safety seat belt, said driver being shown located within a vehicle. Obviously, the concept of this invention can be applied to any seat belt arrangement, regardless whether it be used in any type of vehicle, such as an automobile, truck, van, racing vehicle, or any other type of motive means that incorporates a safety seat belt, particularly having the shoulder harnessing configuration.

Figure 2:
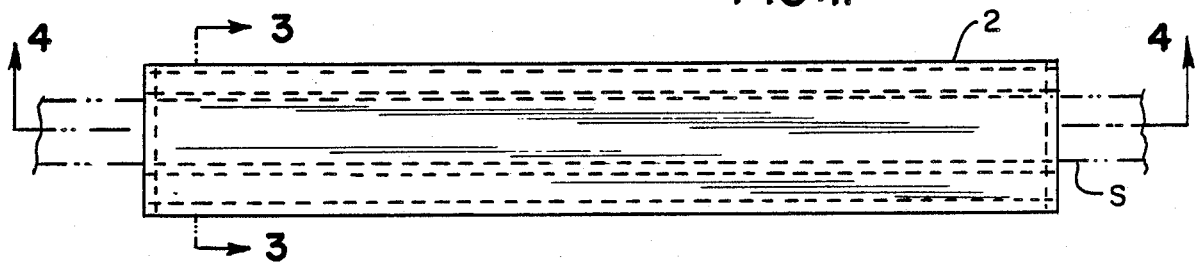
FIG. 2 is a longitudinal front view of the invention shown mounted upon seat belt, which is disclosed in phantom line.
Figure 3:
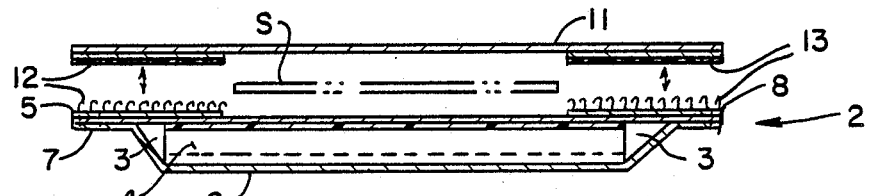
FIG. 3 is a transverse cross sectional view taken along the line 3—3 of FIG. 2, and disclosing the liner locating into closure through the use of a hook and pile fastening means for embracing the seat belt during installation of the invention, of that type which may perhaps be sold in the aftermarket.
Figure 4:
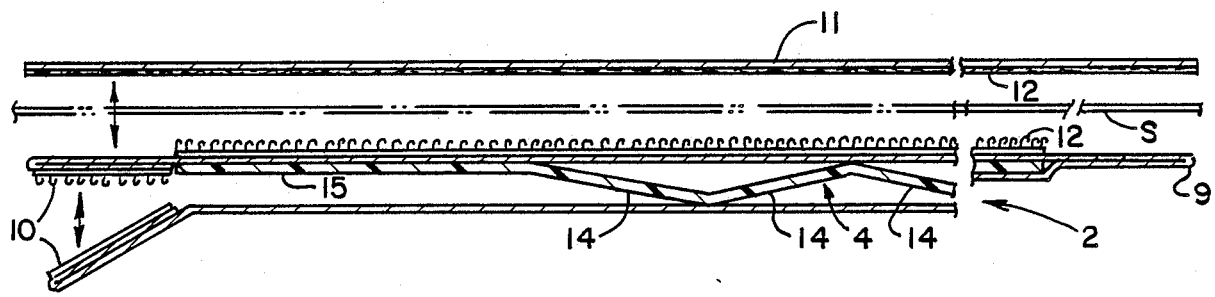
FIG. 4 is a partial longitudinal cross sectional view taken along the line 4—4 of FIG. 2, and showing the sleeve means pocket in the rigid support is located, while the liner is arranged into closure about the emplaced seat belt.

The invention is more aptly disclosed in FIGS. 2 through 4, and is shown in that particular embodiment which may be added to the shoulder harness strap located within a vehicle, as during the aftermarket, as an additional safety means to provide the enhanced results to be obtained from the structure of this invention, when installed. As can be seen, the invention includes a sleeve means 2 which contains a channel therethrough, as at 3, which forms a pocket, and in which is located a substantially rigid but resilient support means 4. The sleeve is generally configured of one or a pair of lengths of very sturdy canvas or other type of cloth material or woven material, or even any woven polymer material, and which may be formed of a pair of layers of the same, as at 5 and 6, or in the preferred embodiment, to facilitate its manufacture and assembly, may include a single length of such material, having approximately twice the length of the restraint 2 as shown in FIG. 2, and which then may be folded over at one end, to provide for the layers 5 and 6, as described. Then, along the lateral edges of the formed sleeve means, stitching, or other forms of fastening, as at 7 and 8, may be applied, in order to form the pocket, generally at the location of 3, and into which the rigid support means 4 may be slid and located generally along the length or height of the sleeve means 2. The folded over bottom end of the sleeve means can be more particularly seen in FIG. 4, as at the location 9.

The upper end of the formed pocket or chamber 3, may be provided with means for closure, as at 10, in this particular instance it may comprise a zipper closure means, or even a form of VELCRO, which is a hook and pile style of connecting means, as noted, in order to provide means for temporary closure of the channel once the rigid support means 4 is located in place.

The rigid support means 4, as can be seen, has a length that approximates, or perhaps slightly shorter thereof, of the sleeve means 2, and it is fabricated generally having a width approximately twice that of the seat belt, as shown at S, for reasons and purposes as previously described. For example, since the concept of this invention is to provide for dissemination of the forces of impact generated through the belt, and onto the frontal surface of the passenger, during automobile impact or collosion, then perhaps the wider the support means 4, the better and more dampening results will be sustained for the forces of momentum and impact, as a result of that transition from the relatively narrow seat belt S, through this passive restraint, and to the support means 4, before the forces are impacted against the chest and abdomen of the passenger. Thus, obviously, this reduces the pressure per square inch exerted upon the passenger, in order to leesen the jarring impact sustained by the passenger when an accident occurs, and thereby reducing his/her injury.

In addition, another key objective of this invention is also to eliminate any creasing that has previously occurred to the seat belt S, wherein in prior accidents, through examination, it has been found that the seat belts have a tendency to crease, along their longitudinal center line, and actually act as a cutting edge for incising into the chest of the passenger, causing more severe injury and damage than the restraint the seat belt was intended to provide in the first instance. But, through usage of this current invention, where the seat belt S is located in close proximity and adjacency overlying the rearwardly disposed support means 4, it can be readily seen that the seat belt does not have any opportunity to crease, and that particular predicament has been eliminated through the structural concept and arrangement of this invention.

As can be noted, as in FIGS. 3 and 4, the seat belt S is likewise arranged within the structure of the passive restraint 1 of this invention, and as can be noted, it is contemplated that said seat belt is arranged at a frontal position with respect to the support means 4, and in this particular instance, is held in position by means of a liner or cover 11, which is integrated into the structure of the sleeve means 2, and which is brought into overlying relationship upon the seat belt S, once it is located therein, with the liner then being rigidly held to the remainder of the sleeve means through the usage of any type of connecting means, such as the longitudinal lengths of VELCRO 12 and 13, provided along the lateral edge lengths of the sleeve means 2, in its structure. As can be seen, since the VELCRO extends inwardly from the side edges of the sleeve means 2, into proximity with the edges of the seat belt S, the seat belt will be reasonably fixed into position as a result, and not be able to slide to either side, thereby maintaining a relatively centralized position overlying frontally of the support means, so that when impact occurs, the full thrust of the seat belt when biased against the body of the passenger will be exerted quite centrally upon the support means 4, to achieve the intended results of the passive restrain of this invention. Obviously, other types of connecting means than VELCRO could be utilized, such that one side of the liner 11 could be stitched in place against the adjacent sleeve means 2, as at 12a while the other side may utilize VELCRO zipper means, or other type of removable fastener, as at 13a so that it could be easily opened, when it is desired to locate this restraint upon the standard seat belt, and then closed, when the passive restraint is located into its performing condition. In any event, when structured in this manner, the passive restraint may be marketed in the aftermarket, so that it can simply and easily be opened, through an unconnecting of its liner of VELCRO or other closure means, the seat belt slid therein, and then once again closed, for immediate usage.

As can also be seen in FIG. 4, the reasonably rigid but resiliant support means 4 is disclosed having a length, as previously explained, approximating or slightly shorter than the sleeve means 2. Preferably, the support means will be molded from a plastic sheet material, and it has been found that a polycarbonate sheet is most useful for this particular function. The sheet will be either initially molded incorporating a series of undulations, as can be seen at 14, throughout its length, with a linear length segment 15 provided at its upper end, and to facilitate its grasping, as when the support means may be inserted or removed from within its pocket 3. Obviously, the undulations could be formed from the sheet material after it is cut to its desired width, such as through the application of thermal setting heat and pressure to the cut sheet in order to rigidify the bends therein, to form the undulating sections 14, throughout the length of the formed support. In addition, any other type of rigid material, which will function to prevent creasing of the overlying and adjacent seat belt, and likewise disseminate its forces of impact upon the passenger, may be utilized for achieving the equivalent purposes of this particular invention. The polycarbonate is defined as a preferred structure, but any equivalent materials, perhaps even metal, may likewise be considered.

Figure 5:
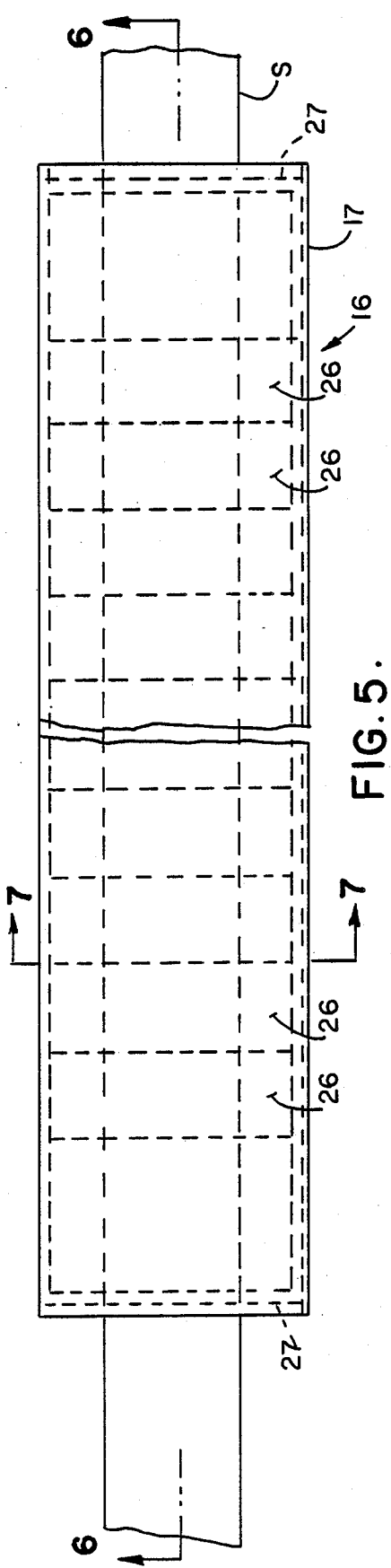
FIG. 5 shows a modification to this invention wherein the passive restraint is installed as original equipment upon a seat belt, and more specifically upon its shoulder harness portion, for permanent installation.
Figure 6:
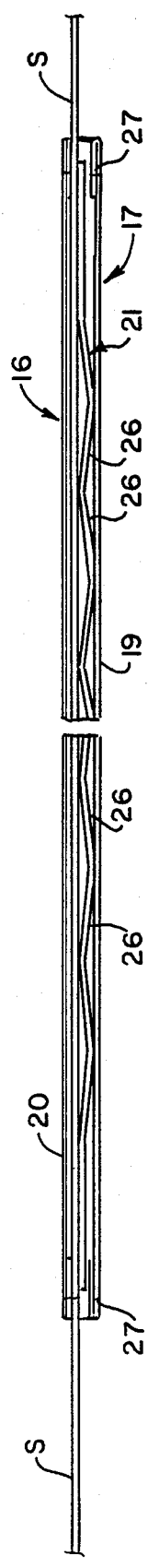
FIG. 6 is a longitudinal sectional view taken along the line 6—6 of FIG. 5, showing the adjacency relationship between the seat belt, the rigid support, as both embodied within the sleeve means of this invention.
Figure 7:
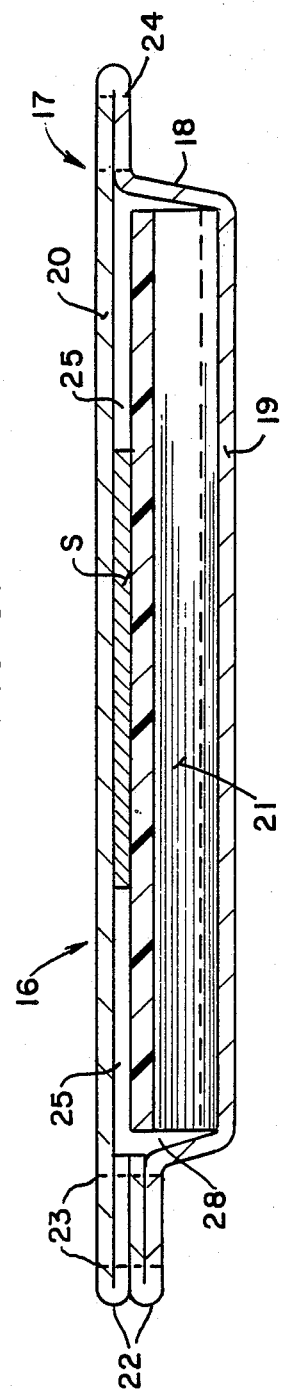
FIG. 7 is a transverse sectional view taken along the 7—7 of FIG. 5, showing the location of the rigid support, and the seat belt, arranged within the sleeve means of this invention.
Figure 8:
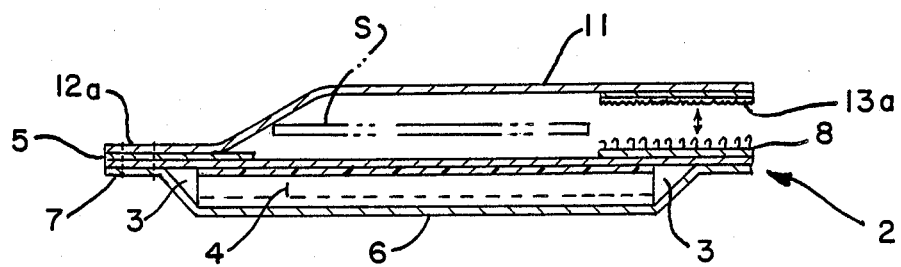
FIG. 8 is a transverse cross-sectional view of a modification to this invention.

A variation upon the installation and usage of this invention is also shown in FIGS. 5 and 6. In this particular instance, the passive restraint 16 is installed in its sleeve means 17 for more permanent installation, such as in original equipment, with the seat belt S being permanently affixed within the restraint, when it is initially installed within the vehicle. Thus, in that manner, the shoulder harness incorporates the structure of this invention, permanently, and it cannot be removed therefrom without disassembly of its integral components. As can be seen, particularly in FIG. 7, the sleeve means could be fabricated from a singularly structured material, such as cloth, polymer, or other woven, or the like fabric, as shown at 18, and may be folded to provide a rearward surface 19 that rests normally against the chest of the passenger, and folded upwardly, as noted, to provide an outer layer 20 for encompassing both the rigid support means 21 in addition to the seat belt S, as noted. Then, the other lateral side edge of the sleeve means may be folded over, as desired, to provide a smooth and uniform selvage, as at 22, and which may be stitched or otherwise permanently connected, as at 23, into closure. Likewise, a related type of fold over and stitching, as at 24, may be provided at the other lateral edge, along the longitudinal length of the sleeve means, in order to provide uniformity of appearance for the structured passive restraint, when installed.

Obviously, in order to centralize the seat belt S when assembled within the restraint 16, when originally installed, any type of spacer means may be used, as at the location 25, in order to maintain the centralized positioning for the seat belt when installed, or in the alternative, the seat belt can be simply adhesively adhered to the rearwardly and underlying disposed support means 21, along is length, in order to maintain a central aligned positioning of these two components together. In addition, it is to be noted that the support means preferably, but not necessarily required, has the undulating structure, as at 26, along its length, to function for the objects and purposes as previously described for the passive restraint of this invention. If the undulations are not there, but the rigid support means is simply a length of polymer, or other light material, it still adequately functions as a means for dissemination of forces, and does prevent creasing of the seat belt, when the impact of an accident occurs. But, adding the undulations does provide a little more cushioning to the functioning of the restraint, in addition to achieving the two foregoing purposes.

As can be seen in FIG. 6, in order to properly position the restraint when located upon the seat belt S, once the various components are assembled together, and located at that proper position to arrange the restraint of this invention, when applied to the seat belt, at a position overlying the chest, thorax, shoulder, and abdomen, of the driver or passenger, then any type of adhering means, such as stitching, may be applied at the location 27, and stitched across the upper and lower respective edges of the sleeve means 17, likewise embracing the seat belt S therein, to affix the restraint into position with respect to the belt, and to always be at that location where it provides full overlying coverage for any passenger seated therein. Likewise, when that type of closure is made, the support means 21 will be enclosed in its pocket 28, and prevented from sliding out of the same.

Variations or modifications to the subject matter of this invention may occur to those skilled in the art upon reviewing the disclosure as made herein. Such variations, if within the spirit of the invention as defined, are intended to be encompassed within the scope of any claims to patent protection issuing upon this development. The description of the preferred embodiment set forth herein is done so for illustrative purposes only.

Having thus described the invention what is claimed and desired to be secured by Letters Patent is:

1. A passive resistance enhancer for application in supplementing the safety of a seat belt during usage, and for application in conjunction with a seat belt of the shoulder harnessing type as provided in vehicles, comprising, a sleeve means of flexible material having first and second channels provided therethrough and extending approximately throughout its length, said sleeve means having a forward surface and a rearward surface, a first channel provided proximate the forward surface within the structure of the sleeve means, and a second channel disposed proximate the rearward surface within the structure of the sleeve means, said seat belt being disposed within said first channel provided proximate the forward surface within the structure of the sleeve means, said passive resistance enhancer including a substantially rigid support, said substantially rigid support contained within the second channel and disposed proximate the rearward surface within the structure of the sleeve means, so as to retain said substantially rigid support and seat belt in separate but adjacent locations within said sleeve means, said rearward surface of the sleeve disposed for resting against the user of the seat belt, said rigid support being at least equal to or wider than the adjacent seat belt, and said rigid support being integral and extending approximately the length of said sleeve, such that upon encountering an impacting force the seat belt biases against said rigid support for dissemination of the forces of impact over a greater surface area for minimizing any damage to the person being passively restrained, said rigid support substantially incorporating undulations along its length to provide for its further cushioning and flattening through longitudinal expansion upon its wearer encountering an impacting force, said sleeve means and substantially rigid support being removable affixed to said seat belt, said second channel within the sleeve means forming a first pocket within which the substantially rigid support inserts, and closure means provided for retaining said substantially rigid support entirely within said first pocket, said first channel provided within said sleeve forming a second pocket into which said belt inserts, and closure means provided for retaining said seat belt within said second pocket, said first and second channels having an intermediate layer disposed longitudinally therebetween, and a liner forming the forward surface of the first channel, closure means provided at least along one side of the liner and layer for providing for their securement together, wherein said closure means comprises stitching along one side edge of the line, securing it within the underlying sleeve means to the layer, and a hook and pile fastening means provided along the other side edge of said liner, removably securing it to the layer of the underlying sleeve means, wherein said hook and pile fastening means capable of being opened for removal of the seat belt from within the first channel and its separation from the sleeve means and the substantially rigid support, said rigid support is formed of a resilient polymer, and said polymer comprising polycarbonate, and wherein said sleeve means incorporates cushioning material so as to cushion the impact of the sleeve means against the wearer upon encountering an impacting force.

* * * * *